United States Patent

[11] 3,564,128

| [72] | Inventor | Harry L. Hosterman<br>Akron, Ohio |
| [21] | Appl. No. | 476,819 |
| [22] | Filed | Aug. 3, 1965 |
| [45] | Patented | Feb. 16, 1971 |
| [73] | Assignee | Goodyear Aerospace Corporation<br>Akron, Ohio |

[54] MULTIPLE SCAN OPTICAL RECORDING APPARATUS
6 Claims, 6 Drawing Figs.

[52] U.S. Cl. .................................................. 178/6.7,
178/7.85, 178/7.88
[51] Int. Cl. ..................................................... H04n 3/00
[50] Field of Search ......................................... 178/6.7
(A), 6.8, 7.7, 7.8, 7.85, 7.88; 88/24; 350/299

[56] References Cited
UNITED STATES PATENTS
3,184,735  5/1965  Chapman et al. ............. 350/299X Primary Examiner—Rodney D. Bennett, Jr.
Assistant Examiner—Joseph G. Baxter
Attorney—A. H. Oldham ABSTRACT: A multiple scan optical recording apparatus combined with a procedure for operation of a cathode ray tube whereby a single sweep has a first pass across the full face of the tube, and then jumps down and returns with a second pass across the full face in substantially parallel opposite relation to the first pass, which includes an optical system to translate such passes in a lined front to end relationship onto a light-sensitive film moved at a controlled speed relative to the optical system. In essence, the optical system incorporates a substantially right angular flat medium having the ability to change the direction of light rays positioned with the apex thereof aligned between the parallel passes with the angle of each side of the medium at about 45° angular relation to the face plate, with associated reflective surfaces to align the rays emitted from the medium in successive front to end relation and project such aligned relation onto the light-sensitive film.

PATENTED FEB 16 1971

INVENTOR.
HARRY L. HOSTERMAN
BY
A H Oldham
ATTORNEY

INVENTOR.
HARRY L. HOSTERMAN

INVENTOR.
HARRY L. HOSTERMAN

MULTIPLE SCAN OPTICAL RECORDING APPARATUS

This invention relates to a multiple scan optical recording apparatus, and more particularly to an optical system combined with a procedure for operation of a cathode ray tube to greatly increase the resolution readout of resolvable elements displayed on the face of the cathode ray tube.

Heretofore it has been well known that radar and data information specifically directed to terrain, and map matching, have been provided by creating reference film information from the optical display of a cathode ray tube. However, the resolution of such information cannot begin to approach the resolution of a normal optical photographic process, because of the limitation of resolution in the cathode ray tubes now used by the art. For example, the current state of the art in cathode ray tube resolution is between 4,000 and 6,000 elements across the face of the tube for each pass of the electron stream writing thereacross. The resolution of a normal optical photographing process might be between 5 and 10 times this number of resolvable elements. An apparatus is needed by the art either to increase the number of resolvable elements represented by each sweep across the face of a CRT tube, or to utilize conventional CRT tubes in a novel manner, with a suitable optical adjusting system to substantially increase the resolvable element readout qualities of such tubes.

Therefore, it is the general object of the present invention to avoid and overcome the foregoing and other difficulties of and objections to prior art practices by the provision of a multiple scan optical recording system which may be readily applied to conventional CRT's to at least double the number of resolvable elements capable of being read out from the tube for each sweep.

A further object of the invention is to provide a simple mirrored or prism optical system in association with a cathode ray tube where one sweep makes two or more passes on the face of the cathode ray tube, which optical system translates such passes in aligned end to end relationship onto a light-sensitive film moved at a controlled speed relative to the optical system.

A further object of the invention is to provide an optical system in association with a particular way to sweep a cathode ray tube whereby the number of resolvable elements in the cathode ray tube as read onto a film recording system can be substantially increased.

A further object of the invention is to provide a very simple, inexpensive, yet highly effective optical system in association with a particular sweep arrangement on a cathode ray tube to obtain much higher resolution of CRT displays.

The aforesaid objects of the invention and other objects which will become apparent as the description proceeds are achieved by providing an apparatus to increase the number of resolvable elements in the face plate display of a CRT which includes the combination of means to control the sweep of the CRT so a complete sweep passes across the face plate once, jumps a spaced distance downwardly and sweeps back across in adjacent uniformly spaced parallel relation to the first sweep, a light-sensitive film movable in a plane adjacent to the CRT and substantially perpendicular to the plane of the face plate, and optical means to align the light emissions from the two passes completing one sweep in successive end to end aligned relation and project such aligned relation for recording onto the light sensitive film.

For a better understanding of the invention reference should be had to the accompanying drawings wherein.

While it should be understood that the principles of the invention might be applicable to certain television operations, film or display data handling, or other suitable system where increased resolution from CRT readout is desirous, the system has been particularly designed for utilization with photographic recording of information receivable and presented optically in a conventional cathode ray tube, and hence it has been so illustrated and will be so described.

In order to understand the problem solved by the system disclosed hereinafter, one should understand that the normal sweep raster of conventional CRT involves a scanning of the full face of the cathode ray tube to represent the full width or length of the particular information being presented therein. Therefore, since the number of resolvable elements across the face plate of conventional CRT now varies between about 3,000 to about 6,000 elements, this is the limiting factor to the resolution capabilities of the cathode ray tube. Thus, if one desired to paint a 20 nautical mile strip with a resolution of 7.5 feet, the cathode ray tube must have 16,000 resolvable elements in the range direction. This number of elements is well beyond the state of the art of the known cathode ray tubes today.

Therefore, the present invention will solve this problem of resolution by altering the normal scan in a CRT as well as the particular readout. To this end, the invention contemplates that one complete sweep will make two or more passes across the face of the CRT, with such passes always being in spaced parallel relationship to each other, and each complete sweep passing over the same track as each previous sweep. Then, an optical system will arrange the passes in end to end aligned relationship and project such aligned passes representing a full sweep onto a suitable display and recording surface, such as a photographic film. In this manner, the now limited resolution capabilities of a CRT can be increased in any multiple simply by breaking a complete sweep down into a plurality of passes or scans across the face of the CRT.

It should be clearly understood that the optical system described above and hereafter is static, as opposed to a dynamic system with moving mirrors or prisms.

Figure 4:
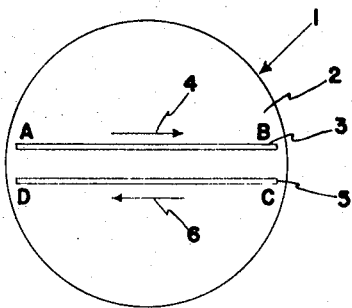
FIG. 4 is a schematic illustration of the face of the CRT indicating how the passes are aligned to increase the resolution.

To better understand the above principle, reference should be had first to FIG. 4 which illustrates a cathode ray tube generally by the numeral 1 showing that a full sweep, representing for example 20 nautical miles is broken down into two passes across a face plate 2 of the CRT 1. Namely, pass AB indicated by numeral 3 may be in a direction indicated by an arrow 4 to represent 10 nautical miles, with the pass then rapidly stepped down to a point C to then make a reverse pass CD, indicated by numeral 5, in a direction shown by arrow 6 to represent the remaining 10 nautical miles of the sweep. Conventional CRT driving equipment can be easily altered to give this two pass sweep, or a sweep of any number of passes. Then, a suitable optical system, to be described hereinafter, simply arranges both passes 3 and 5 in end to end aligned relationship for recordation, as indicated in FIG. 4A, whereby the resolution available from the CRT 1 has been doubled.

Figure 1:
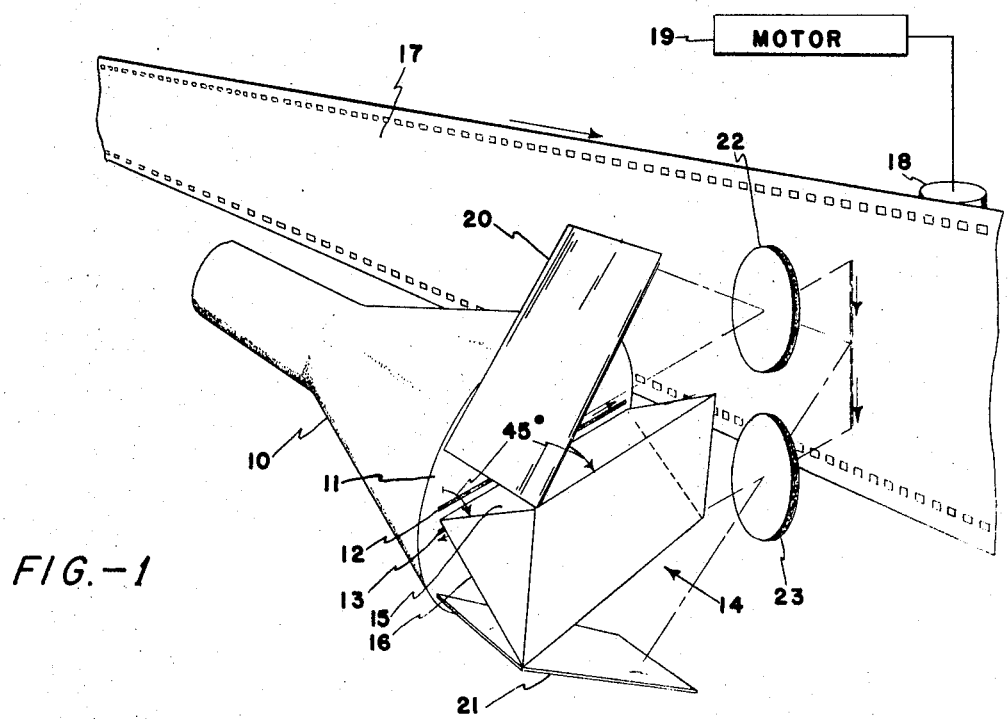
FIG. 1 is a perspective view of one embodiment of the invention showing the relative relationship of the optical system in conjunction with the light-sensitive film.
Figure 4A:
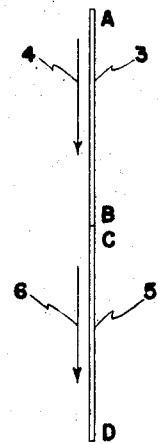
FIG. 4A is a schematic illustration of the passes of FIG. 4 in aligned relationship.

For a better understanding of the specifics of the optical system used to achieve the effects of FIG. 4A, reference should be had to FIG. 1 wherein the numeral 10 indicates a substantially conventional cathode ray tube having a conventional face plate 11 with a properly coated inner surface whereon an electron stream paints an optical picture, all in the usual manner. However, the driving arrangement for the electron stream is controlled so that one sweep is made in at least two passes back and forth across the face plate 11, as described above. For example, a sweep 12 might move from left to right, and then step down so sweep 13 moves from right to left. The invention then contemplates that a right angled mirror indicated generally by numeral 14, is positioned so that its apex lies in parallel relationship substantially between the passes 12 and 13, as clearly indicated. The mirror 14 has both its mirrored surfaces 15 and 16 lying in similar angles relative to the face plate 11. In this instance, with the right angular mirror, such angles would be 45°. The precise positioning of the mirror 14 is essential to the proper functioning of the particular optical pick up. It should be understood that suitable right angular prisms might be utilized in place of the mirror 14 with the hypotenuse or long side of the prisms taking the place of the surfaces 15 and 16 and with one of the short sides of the prisms lying in adjacent relationship to the face plate 11.

A film strip 17 is positioned adjacent the CRT and provided with relative movement of the CRT 10 by a roller 18 driven by motor 19. The strip 17 lies in a plane perpendicular to the plane of the face plate 11 and the planes of the surfaces 15 and 16 of the mirror 14. As will be more fully explained later, the movement of the film strip 17 must be exactly coordinated with the scanning of the electron beam in the cathode ray tube 10 so that an exact reproduction of the image scanned will be produced on the film strip 17. Such movement might be constant at a determined speed or jumping from stop to stop as a motion picture film.

In order to complete the optical projection of the sweep represented by the double scans 12 and 13, suitable reflecting mirrors 20 and 21 are mounted at 45° angles relative to the apex of the mirror 14 and adjacent one end thereof. Such mirrors 20 and 21 thus in conjunction with suitable focus lenses 22 and 23, respectively, optically align the scans 12 and 13 into end to end relationship on the film strip 17. Since some adjustment of the projected images of scans 12 and 13 must be done to achieve the alignment, it is anticipated that the lenses 22 and 23 will be translatable in a plane perpendicular to the face plate 11. However, it should be understood that the axes through such lenses 22 and 23 will preferably remain in perpendicular relationship to the film strip 17.

Figure 2:
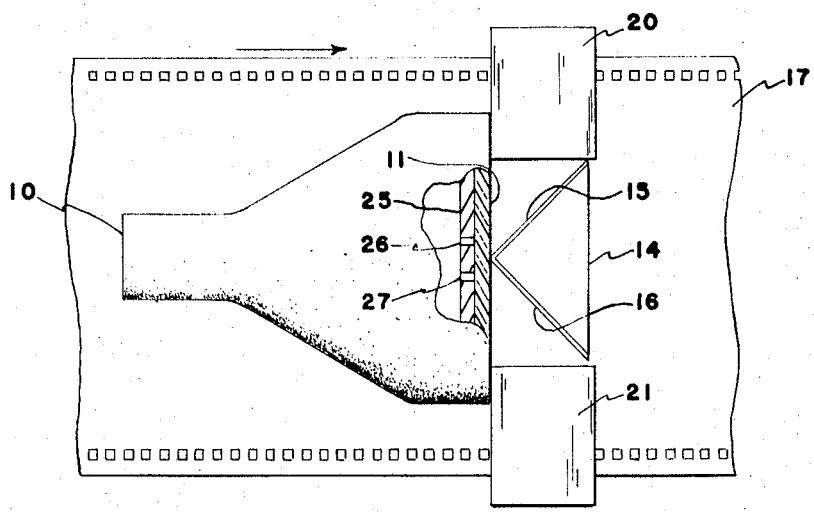
FIG. 2 is a side elevational view in partial cross section showing the specific angular relationship of the optical system relative to the CRT and the light sensitive film.

FIG. 2 shows the particular and specific angular relationships between the right angular mirror 14 and the side reflecting mirrors 20 and 21, mounted adjacent the one end thereof. FIG. 2 also shows in the cross-sectional portion that the phosphorescent face plate 11 might be provided with an internal mask 25 defining specific slits 26 and 27, respectively, which will greatly increase the resolution of the passes 12 and 13 shown in FIG. 1. For example, if each of the slits 26 and 27 were .005 inches wide and of appropriate length to cover the full width of the passes, the electron beam could be in an elliptical shape and allow for some vertical astigmatism in its moving path. Actually, such vertical astigmatism is inherent in the conventional cathode ray tube so that such mask increases the resolution capabilities to within approximately .0005 inches as compared to the normal resolution or precision of appropriately .004 to .005 inches available without the mask 25. Therefore, where a great degree of precision is necessary in transferring the images painted by the electron tube onto the film 17, a mask might prove desirable. If the state of the art in electron beam painting on the face plate of a cathode ray tube were increased to such resolution precision as required, a mask would not be necessary.

Figure 3:
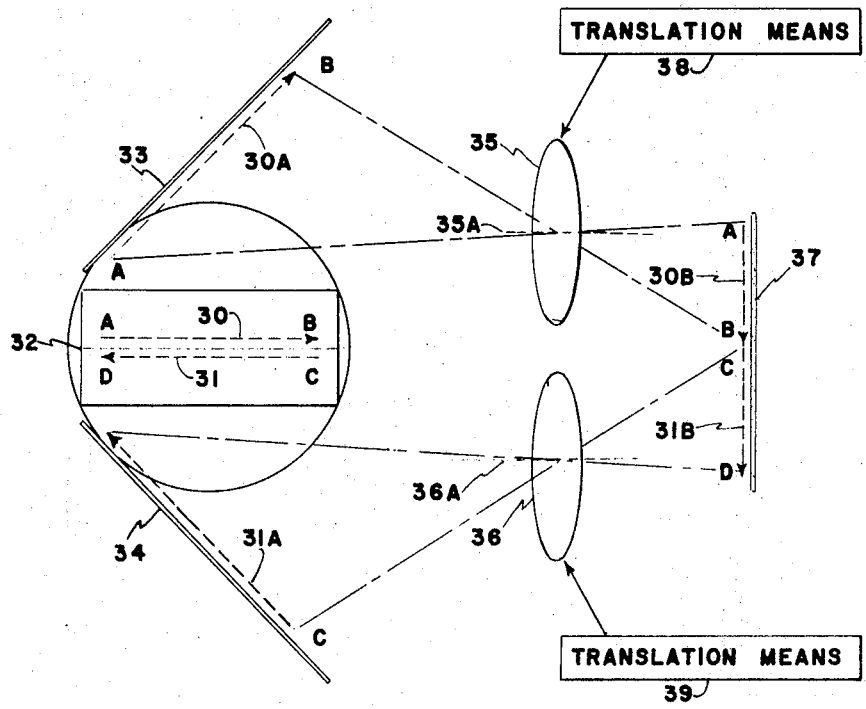
FIG. 3 is a schematic end on view of the CRT showing the respective position of all the components of the optical system relative thereto.

FIG. 3 illustrates in a more schematic form the exact optical relationship for a right-hand directed dotted arrow 30 representing the first pass in a two pass sweep, while a left-hand directed dotted arrow 31 represents the second pass to complete the sweep. The arrows 30 and 31 are reflected from the particular right angled mirror or prism, indicated generally by 32 onto the respective 45° angularly directed side mirrors 33 and 34, into the positions indicated by dotted arrows 30A and 31A, respectively. It should be understood, as set forth above, that the mirrors or prisms associated with the cathode ray tube will preferably be in fixed relationship at the specific angles mentioned. Thus, the method to properly align the particular arrows 31A and 30A in end to end relationship is accomplished by respective focus lenses 35 and 36. The lenses 35 and 36 are mounted with their axes 35A and 36A, respectively in perpendicular relationship to a light sensitive film 37. Thus, alignment of the arrows represented by 30B and 31B onto the film 37 is accomplished by translatory movement of the lenses 35 and 36 by respective translation means 38 and 39. Such translation means can only move the lenses 35 and 36 in a plane where their axes 35A and 36A always remain perpendicular to the film 37. Of course, it should be understood that reduction or enlargement in size of the particular arrows 30 and 31 representing the full sweep on the CRT may be achieved on the film 37 by appropriately utilizing different lenses 35 and 36 or varying the spacing of the film 37 relative to the lenses, all in the well-known optical manner now utilized for photo enlargement or reduction.

Figure 5:
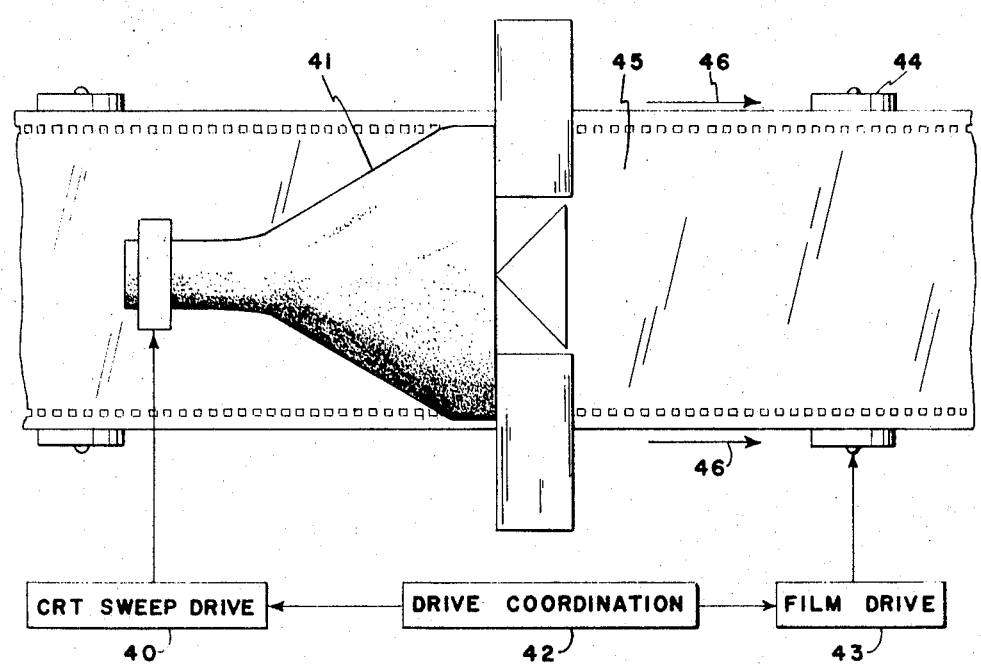
FIG. 5 is a schematic block diagram of the equipment necessary to achieve coordination between the drive to the CRT and the drive to the film.

FIG. 5 schematically illustrates that a CRT sweep drive 40 utilized to control the sweep to a CRT 41 is coordinated through a drive coordinator 42 in conjunction with a film drive 43 which drives through a roller 44 to effect movement of a film 45 in a direction indicated by arrow 46. In other words, such drive coordinator 42 insures that the film 45 is moved at a speed in accordance with the sweep across the face of the CRT 41. While the invention contemplates that the film 45 will preferably be moved at a uniform constant speed in coordination with the sweep of the CRT, such movement could be in uniform steps with the film stationary between steps, much in the same manner as the film is moved through a motion picture camera or projector. Anyway, such movements are always coordinated with the sweeps on the CRT.

While the invention only shows a sweep broken down into two passes across the face of the CRT to double the resolution thereof, it should be understood that the invention contemplates that one sweep might be broken down into any number of passes with suitable optical translation thereof into aligned relation on a recording means. It is preferable that the step down from pass to pass be from the adjacent end of one pass to the adjacent end of another pass, rather than back to the beginning so that each pass is in the same direction, since such step down can be accomplished much more rapidly than a moving back to the original starting side. With the reversing pass technique, the resolution lost jumping or stepping down from one pass to the next is very small. For example, a step down time can be as short as .031 microseconds if a step voltage of 100 volts is applied to a 1.0 uh deflection yoke such as the Celco type AW 414–P 790 manufactured by Constantine Engineering Laboratory Co., Mahwah, New Jersey.

Also, of course the particular type of light-sensitive recording film will depend upon the particular characteristics of the CRT being utilized. However, with the state of the art in today's cathode ray tubes, a density on Ansco Hyscan film, as manufactured by the Ansco Film Corporation, of slightly over 2.0 at a wiring speed of 12 microseconds per centimeter and a beam current of 5 microamps as one specific example would certainly meet the necessary requirements to properly achieve the objects of the invention.

Therefore, it is seen that the objects of the invention have been achieved by providing a new procedure to operate standard CRT tubes making a full sweep equivalent to two or more passes across the face of the CRT, preferably with each successive pass in an opposite direction spaced and parallel to each preceding pass. A suitable optical arrangement is provided to align the passes in end to end relationship for projection onto a light sensitive recording film. In this manner, the resolution capabilities of conventional cathode ray tubes can be substantially multiplied.

While in accordance with the Patent Statutes only one best known embodiment of the invention has been illustrated and described in detail, it is to be particularly understood that the invention is not limited thereto or thereby, but that the inventive scope is defined in the appended claims.

I claim:

1. In an optical apparatus to increase the number of resolvable elements in the display of a cathode ray tube the combination of:
    a cathode ray tube having a display face plate;
    means to mask the internal side of the faceplate into two narrow elongated slits in spaced parallel aligned relation extending across the face plate;

means to alter the normal raster sweep of the cathode ray tube so that each complete sweep passes the length of one of said slits, is stepped immediately to the adjacent end of the other slit and then passes down the length of said other slit;

a right angular flat mirrored surface positioned with the apex thereof aligned between the slits and in engagement with the outer surface of the faceplate with the angle of each mirrored surface to the face plate being 45°;

separate flat mirrors mounted so as to be adjustable in various planes always normal to the surface of the faceplate;

a light-sensitive filmstrip movable in a plane adjacent the edge of the cathode ray tube and perpendicular to the plane of the faceplate and both surfaces of the right angular flat mirrored surface; and lens means between the light-sensitive film strip and the separate flat mirrors for focusing the images from the separate flat mirrors onto the filmstrip whereby the traces illuminated through the slits of the cathode ray tube will be aligned in end to end relation on the filmstrip.

2. An apparatus according to claim 1, where the movement of the light-sensitive recording means is coordinated to correspond with the sweep rate directed onto the face plate of the cathode ray tube.

3. In an optical apparatus to increase the number of resolvable elements in the recorded display of a cathode ray tube the combination of:

a cathode ray tube having a display face plate;

means to alter the normal raster sweep of the cathode ray tube so that each complete sweep makes at least two passes across the face plate whereby each successive pass is stepped immediately to make a reverse pass in spaced parallel relation thereto;

a plurality of first flat reflective surfaces extending from the surface of the faceplate between each pass and the full length thereof at a 45° angle to the faceplate;

a plurality of second flat reflective surfaces mounted in fixed relation perpendicular to the faceplate at one end of the first flat reflective surfaces and inclined at a 45° angle to the planes thereof and at a 45° angle to the intersection of said first reflective surfaces to the face plate;

a light-sensitive filmstrip movable in a plane adjacent the edge of the cathode ray tube and substantially perpendicular to the plane of the faceplate and all the first flat reflective surfaces in a path to receive images reflected by the second flat reflective surfaces; and lens means between the light-sensitive filmstrip and the second flat reflective surfaces for focusing the images reflected from the second flat reflective surfaces onto the filmstrip whereby the passes illuminated on the faceplate of the cathode ray tube will be aligned in end to end relation on the filmstrip.

4. An apparatus according to claim 3 where the first and second reflective surfaces are mirrors.

5. An apparatus according to claim 3 where two passes constitute a sweep and there are two first reflective surfaces and two second reflective surfaces.

6. An apparatus according to claim 3 where the internal side of the faceplate is masked to define narrow elongated parallel spaced slits to more accurately represent the passes on the faceplate of the cathode ray tube.